P. WIGGEN.
EXPRESSION DEVICE FOR MUSICAL INSTRUMENTS.
APPLICATION FILED AUG. 23, 1916.

1,278,269.

Patented Sept. 10, 1918.
12 SHEETS—SHEET 1.

Witness:
Leo J. Dumais

Inventor:
Peder Wiggen
By Chas. Tillman Atty.

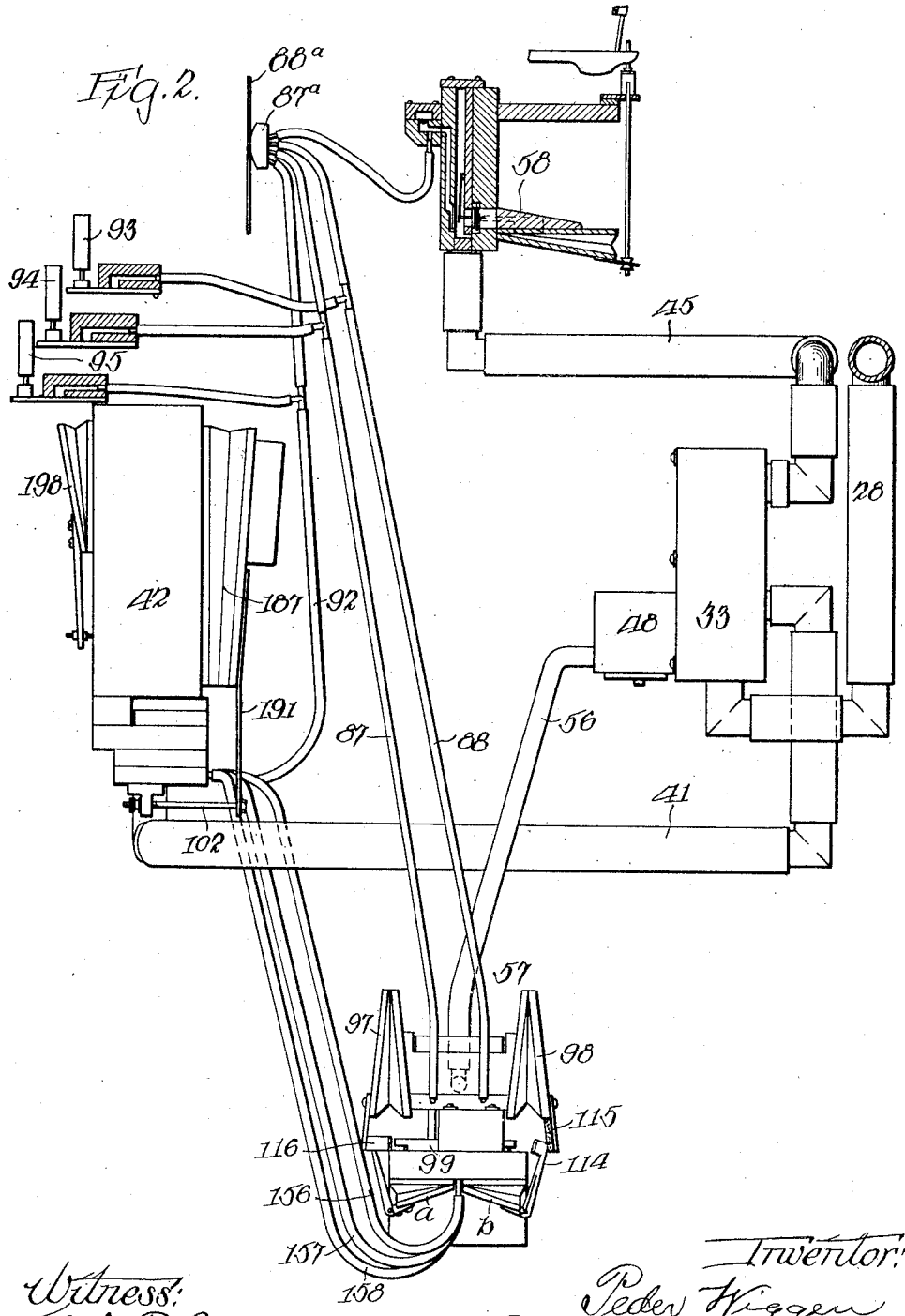

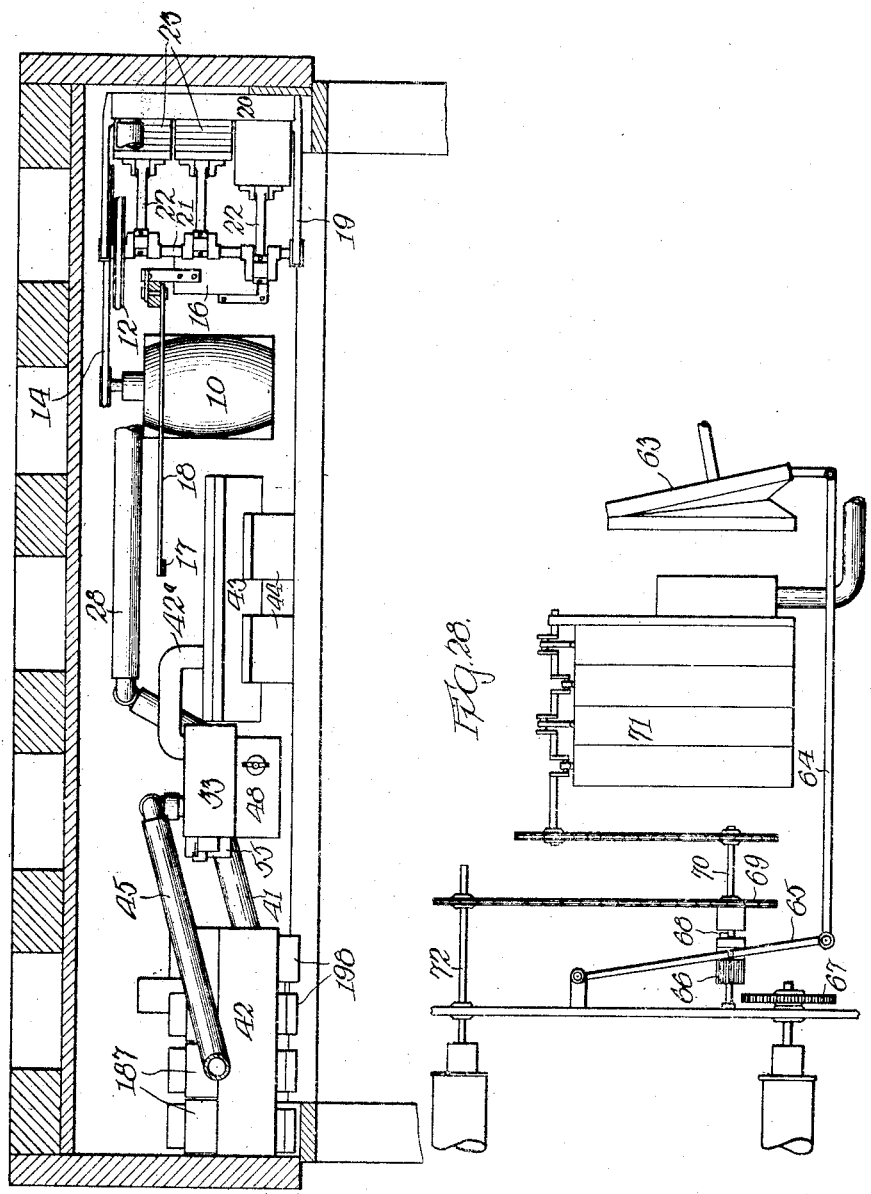

P. WIGGEN.
EXPRESSION DEVICE FOR MUSICAL INSTRUMENTS.
APPLICATION FILED AUG. 23, 1916.
1,278,269.
Patented Sept. 10, 1918.
12 SHEETS—SHEET 4.
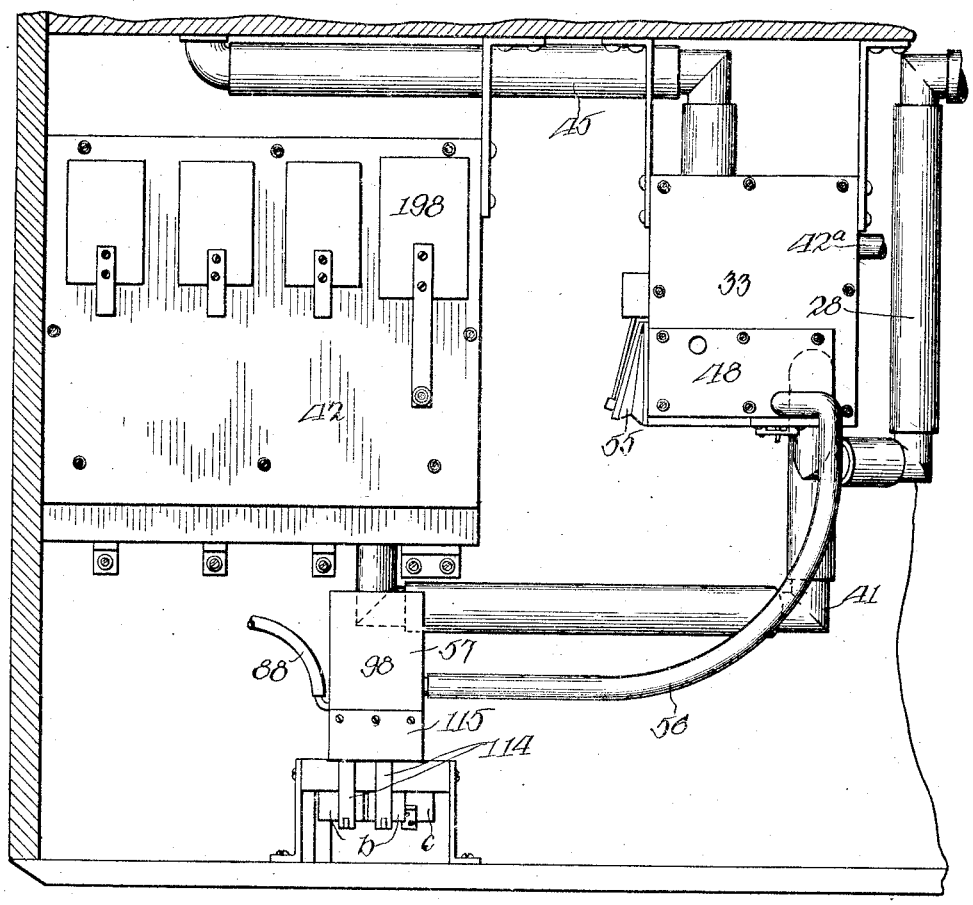
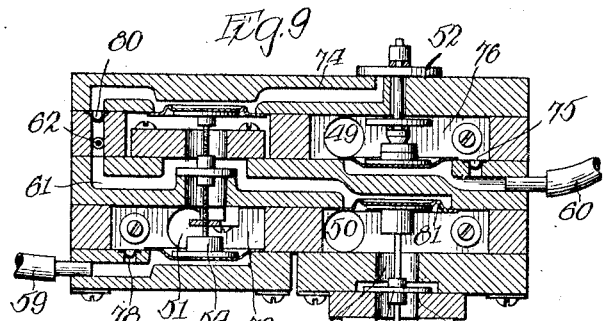

P. WIGGEN.
EXPRESSION DEVICE FOR MUSICAL INSTRUMENTS.
APPLICATION FILED AUG. 23, 1916.
1,278,269.
Patented Sept. 10, 1918.
12 SHEETS—SHEET 5.
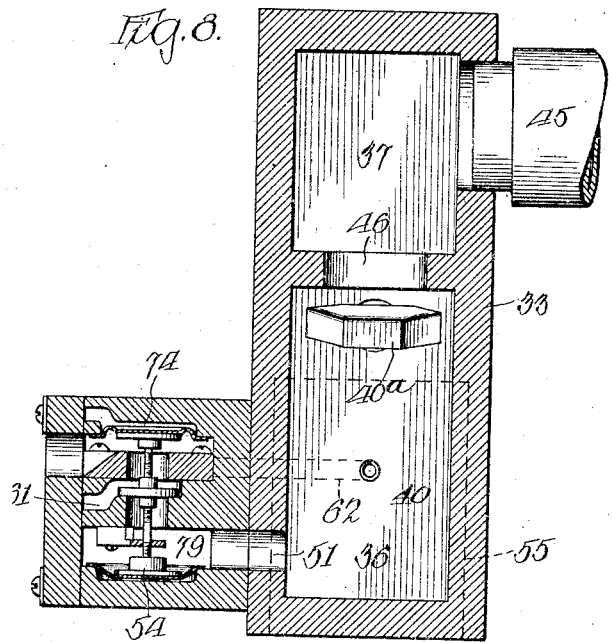
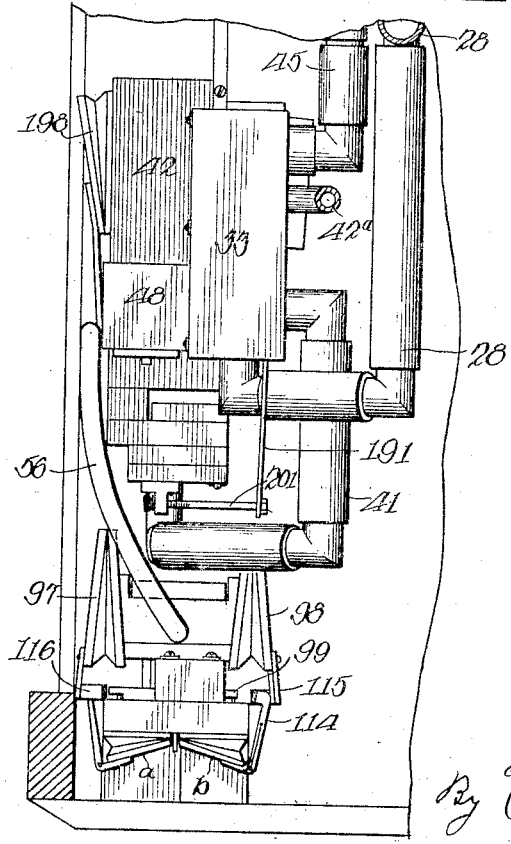

P. WIGGEN.
EXPRESSION DEVICE FOR MUSICAL INSTRUMENTS.
APPLICATION FILED AUG. 23, 1916.

1,278,269.

Patented Sept. 10, 1918.
12 SHEETS—SHEET 6.

Witness:
Leo J. Dahms

Inventor:
Peder Wiggen
By Chas. C. Tillman Atty

P. WIGGEN.
EXPRESSION DEVICE FOR MUSICAL INSTRUMENTS.
APPLICATION FILED AUG. 23, 1916.
1,278,269.
Patented Sept. 10, 1918.
12 SHEETS—SHEET 7.
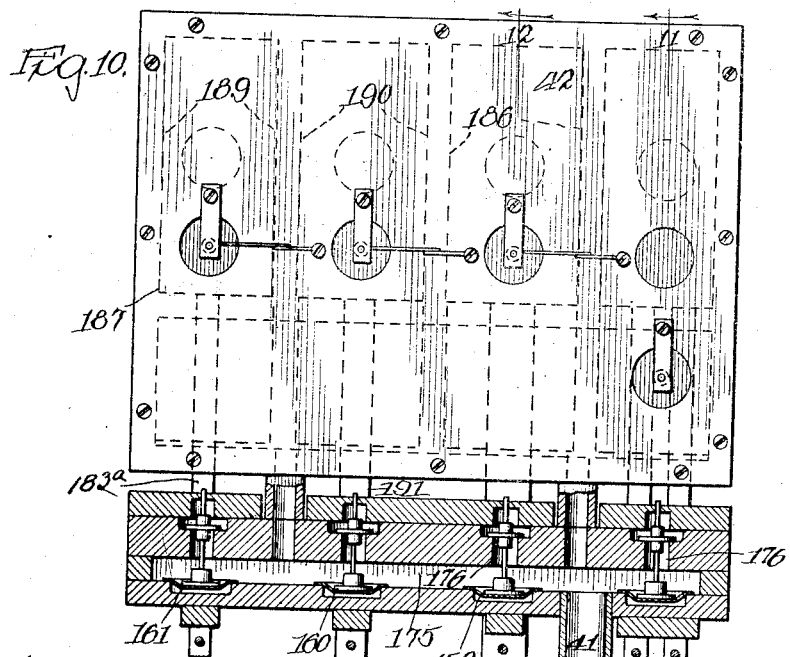
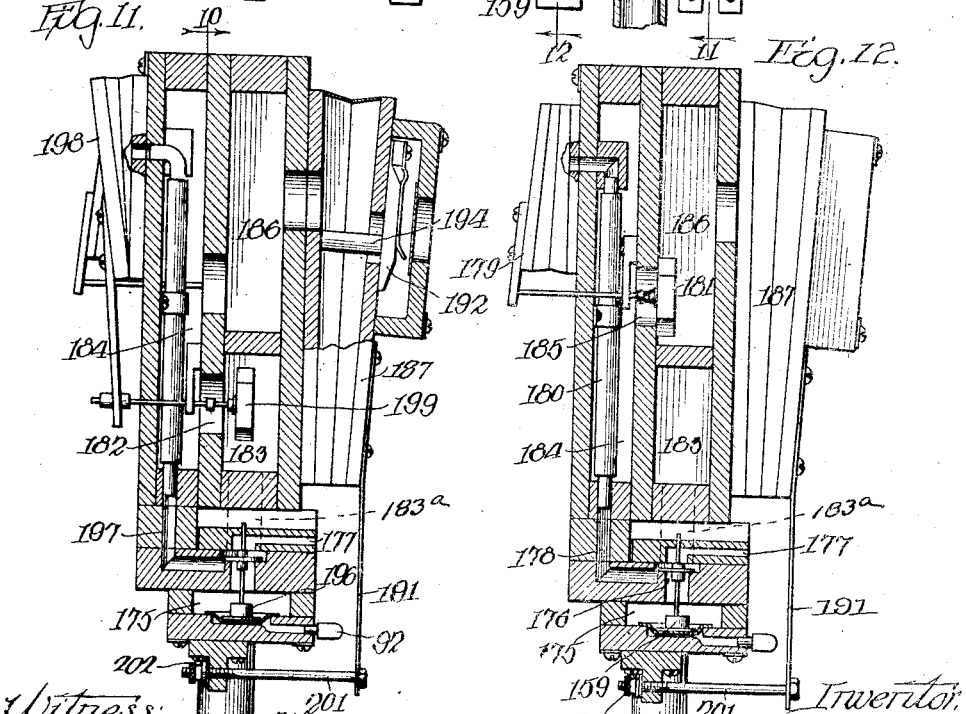

P. WIGGEN.
EXPRESSION DEVICE FOR MUSICAL INSTRUMENTS.
APPLICATION FILED AUG. 23, 1916.
1,278,269.
Patented Sept. 10, 1918.
12 SHEETS—SHEET 8.
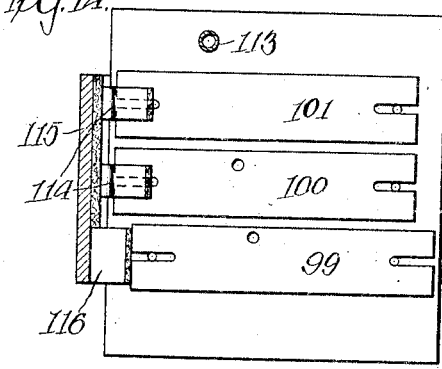
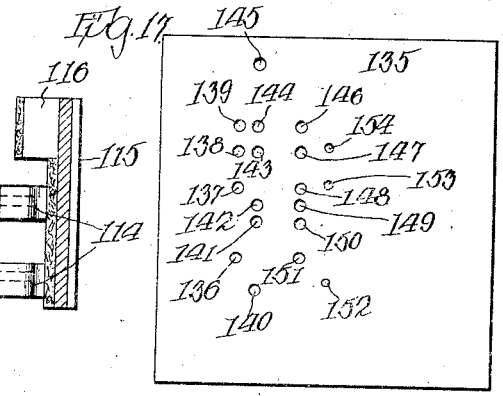
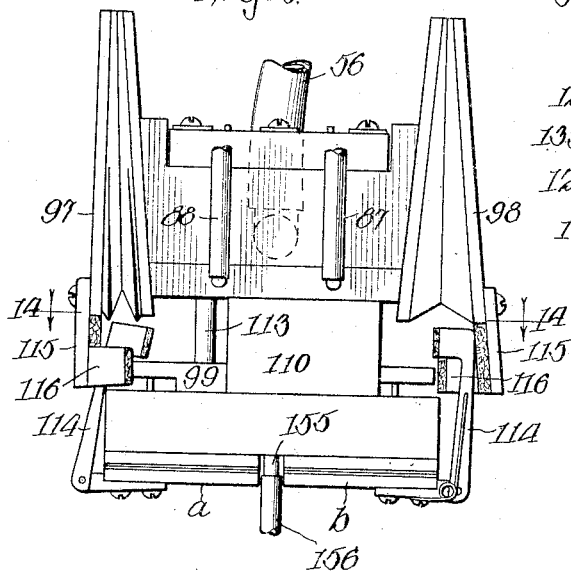
Witness:
Leo J. Dumas
Inventor:
Peder Wiggen
By Chas. A. Tillman
Atty.

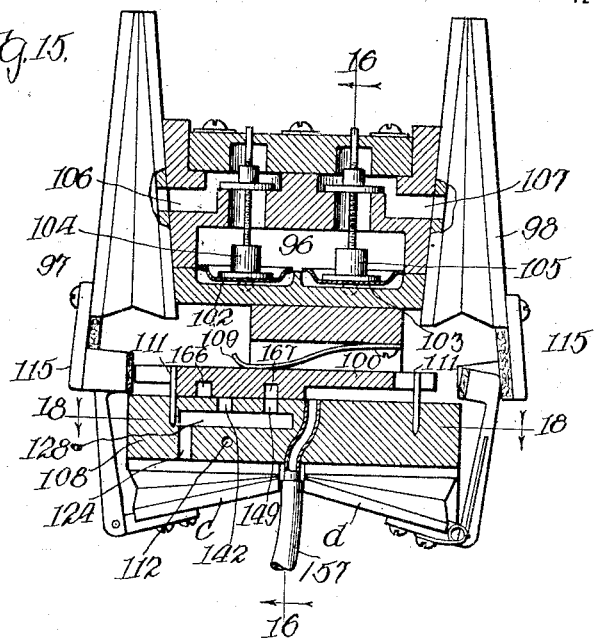
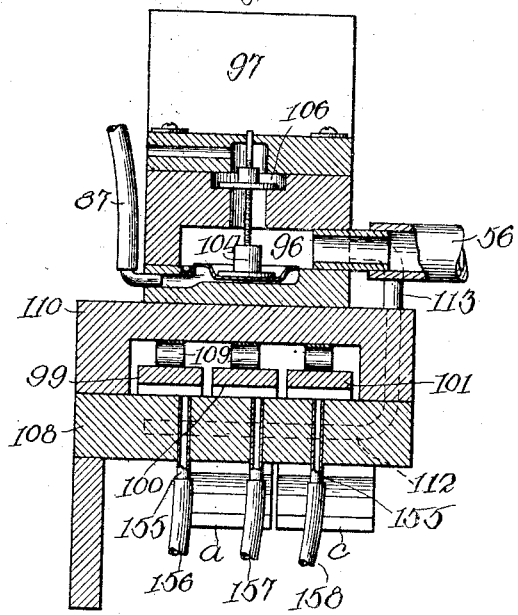

P. WIGGEN.
EXPRESSION DEVICE FOR MUSICAL INSTRUMENTS.
APPLICATION FILED AUG. 23, 1916.
1,278,269.
Patented Sept. 10, 1918.
12 SHEETS—SHEET 10.
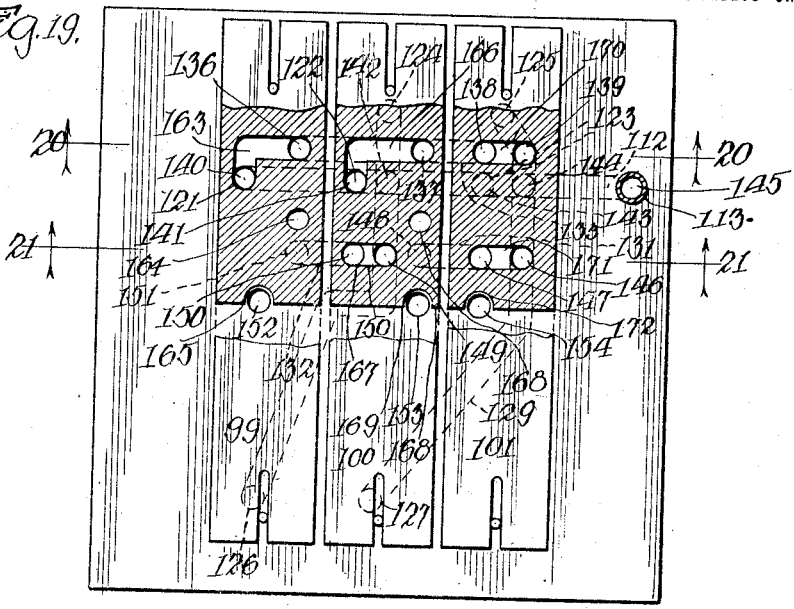
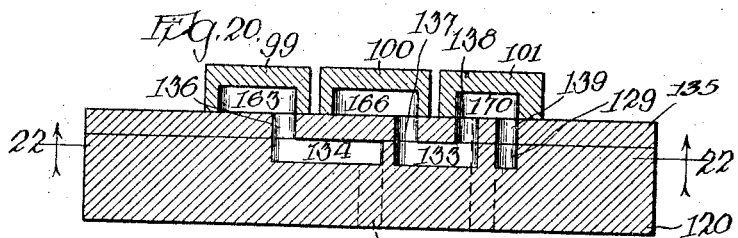
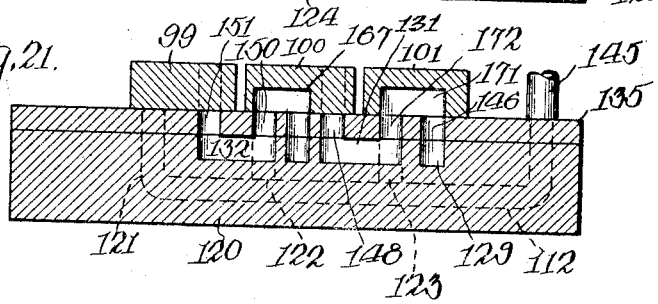

P. WIGGEN.
EXPRESSION DEVICE FOR MUSICAL INSTRUMENTS.
APPLICATION FILED AUG. 23, 1916.
1,278,269.
Patented Sept. 10, 1918.
12 SHEETS—SHEET 11.
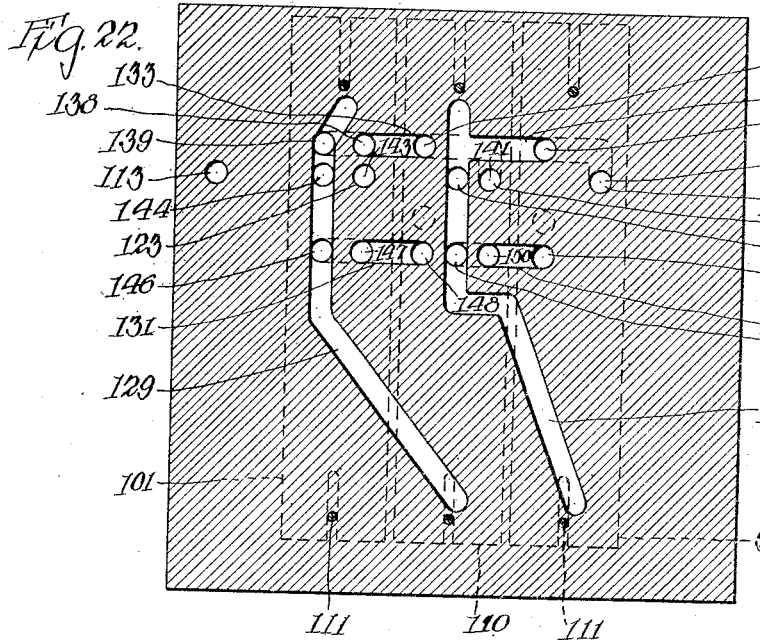
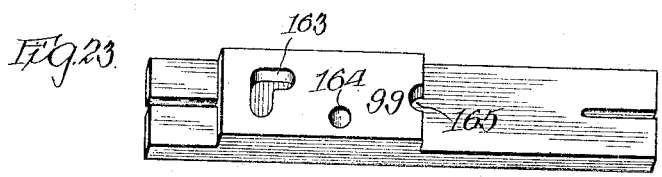
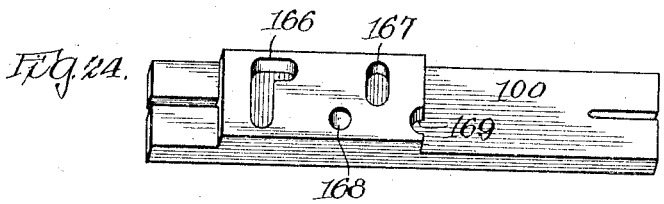
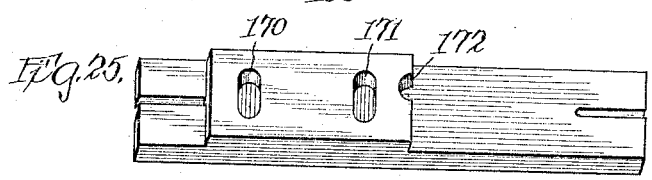

P. WIGGEN.
EXPRESSION DEVICE FOR MUSICAL INSTRUMENTS.
APPLICATION FILED AUG. 23, 1916.

1,278,269.

Patented Sept. 10, 1918.
12 SHEETS—SHEET 12.

UNITED STATES PATENT OFFICE.

PEDER WIGGEN, OF CHICAGO, ILLINOIS, ASSIGNOR TO J. P. SEEBURG PIANO COMPANY, OF CHICAGO, ILLINOIS, A CORPORATION OF ILLINOIS.

EXPRESSION DEVICE FOR MUSICAL INSTRUMENTS.

1,278,269.

Specification of Letters Patent. Patented Sept. 10, 1918.

Application filed August 23, 1916. Serial No. 116,472.

*To all whom it may concern:*

Be it known that I, PEDER WIGGEN, a citizen of the United States, residing at Chicago, in the county of Cook and State of Illinois, have invented certain new and useful Improvements in Expression Devices for Musical Instruments, of which the following is a specification.

This invention relates to improvements in expression devices for musical instruments, and is herein shown and described in connection with a player piano mechanism. The object of the invention is the production of a device which may automatically control the player action to increase or decrease the volume of sound and to vary this increased or decreased condition from the highest to the lowest degree. The means whereby this may be accomplished includes a suitable automatically controlled mechanism, which varies the reduced air pressure by which the player action pneumatics are actuated. The device also has as its object the production of an arrangement whereby a certain portion of the piece of music, which is being played, may be automatically accentuated. A further object is to provide means whereby the mechanism is automatically caused to rewind the music sheet and to restore the various mechanisms after the completion of the piece which has been played, to the playing position. These various actuations of the mechanisms may be accomplished through the medium of certain perforations provided in the music sheet, which control apertures preferably provided in the tracker bar, and are suitably connected with controlling valves arranged to control pneumatics which actuate other valve mechanisms which may be actuated consecutively to operate valves provided in an expression box. These valves provided in the expression box are coöperatively connected with tension devices of various degrees of strength, which control air inlet valves.

It will be understood from the following explanation of the device that the tension devices are arranged or designed so that each will require a different degree of reduced air pressure to operate it, consequently the means which is controlled by these tension devices cannot operate until the required reduced air pressure exists, and as the device in which the reduced air conditions exists is connected with the player action it can readily be seen that the player pneumatics can only be actuated by a force which corresponds to that at which the tension devices are set.

A further object of the invention is to accomplish these and other objects in a simple and expeditious manner, which will be comparatively simple in construction without resulting in a corresponding reduction of efficiency.

The invention will be explained by referring to the accompanying drawings, which serve to illustrate an embodiment of the invention, and in which—

Fig. 2, is a diagrammatical view of the structure shown in Fig. 1.

Fig. 3, is a sectional plan view taken on line 3—3 of Fig. 1.

Fig. 4, is an enlarged detail view of a portion of the mechanism shown in Fig. 1.

Fig. 5, is an end view of the device shown in Fig. 4.

Fig. 8, is a section taken on line 8—8 of Fig. 6.

Fig. 9, is a section taken on line 9—9 of Fig. 7.

Fig. 10 is a sectional view, of the expression box, taken on line 10—10 of Fig. 11.

Fig. 11, is a section taken on line 11—11 of Fig. 10 and also showing the spring tension devices.

Fig. 12, is a section taken on line 12—12 of Fig. 10.

Fig. 13, is an elevation of the sound controlling mechanism.

Fig. 14, is a section taken on line 14—14 of Fig. 13.

Fig. 15, is a partial sectional view of the mechanism shown in Fig. 13.

Fig. 16, is a section taken on line 16—16 of Fig. 15.

Fig. 17 is a top plan view of the valve block showing the position of the ports which connect with valves employed in the device.

Fig. 18, is a section of the valve block taken on line 18—18 of Fig. 15.

Fig. 19, is a top plan view of the valve block showing the valves positioned thereon which coöperate with the ports and passages shown in Figs. 17 and 18.

Fig. 20, is a section taken on line 20—20 of Fig. 19.

Fig. 21, is a section taken on line 21—21 of Fig. 19.

Fig. 22, is a section taken on line 22—22 of Fig. 20.

Figs. 23, 24 and 25 are perspective views of the underside of the valves shown in Figs. 19, 20, and 21.

Fig. 28 is a detail front elevation of the motor and music roll driving mechanism.

Figure 1:
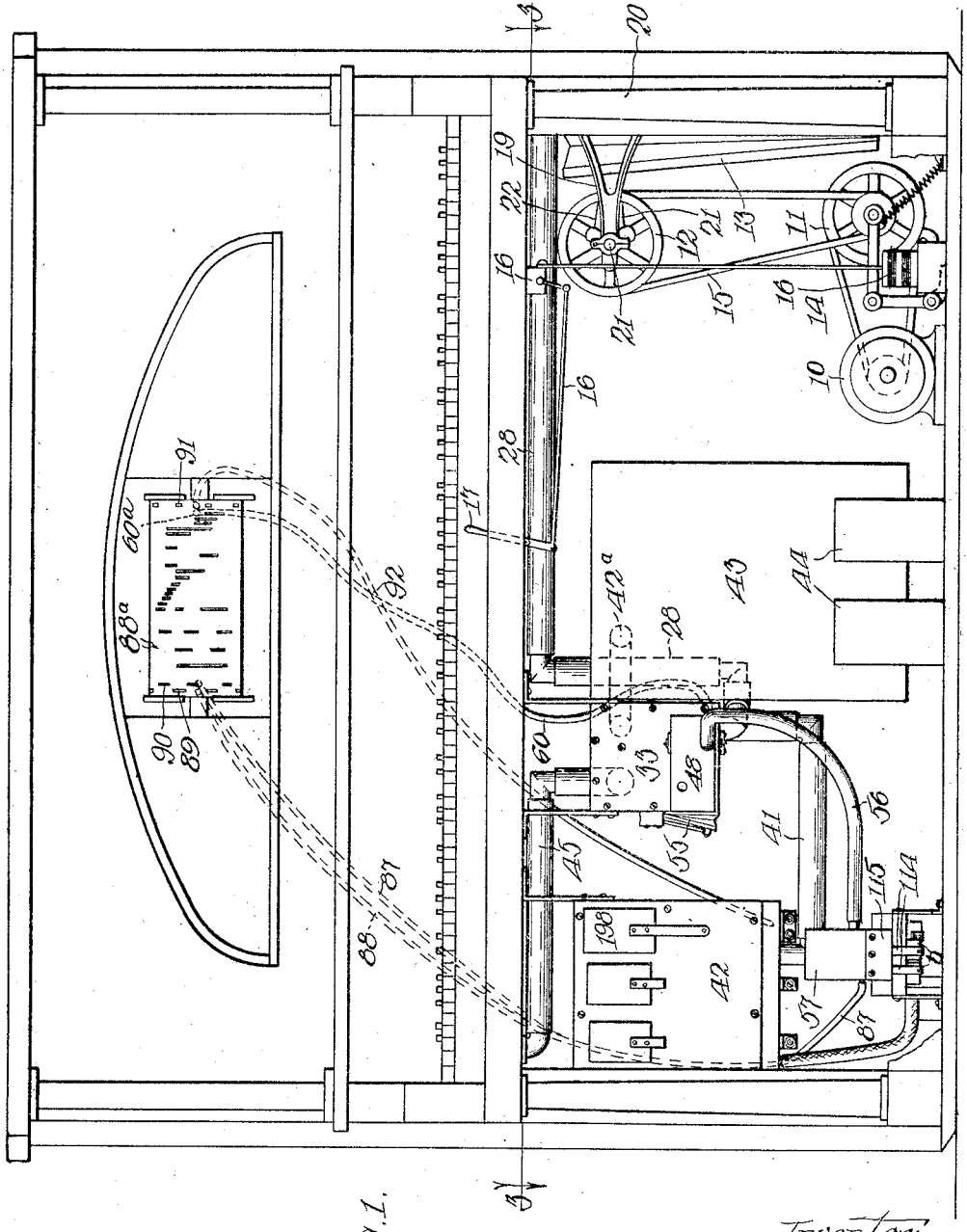
Figure 1, is a front elevation of a piano showing the general arrangement of the various instrumentalities employed in the construction of the device.

By referring to the drawings and particularly to Fig. 1 it will be seen that the wind producing apparatus is capable of being actuated either mechanically or manually as desired.

I prefer to operate the same by suitable mechanical contrivances which include the motor 10, the pulleys 11 and 12 and the power pneumatics 13. The pulleys 11 and 12, are suitably connected together by the belt connections 14 and 15. The motor 10 is controlled by an ordinary electric switch 16 and coöperating lever connections 17 and 18. The pulley 12 is carried by a bracket 19 which is secured to any substantial portion of the frame-work 20. A crank shaft 21, is journaled in this bracket and has attached thereto links such as 21 and 22, which have their opposite ends connected to the feeder bellows 13. It is obvious that when the crank shaft is operated the said pneumatics will also be caused to operate and create the desired vacuum or reduced pressure to cause the other portions of the device to operate.

Figure 6:
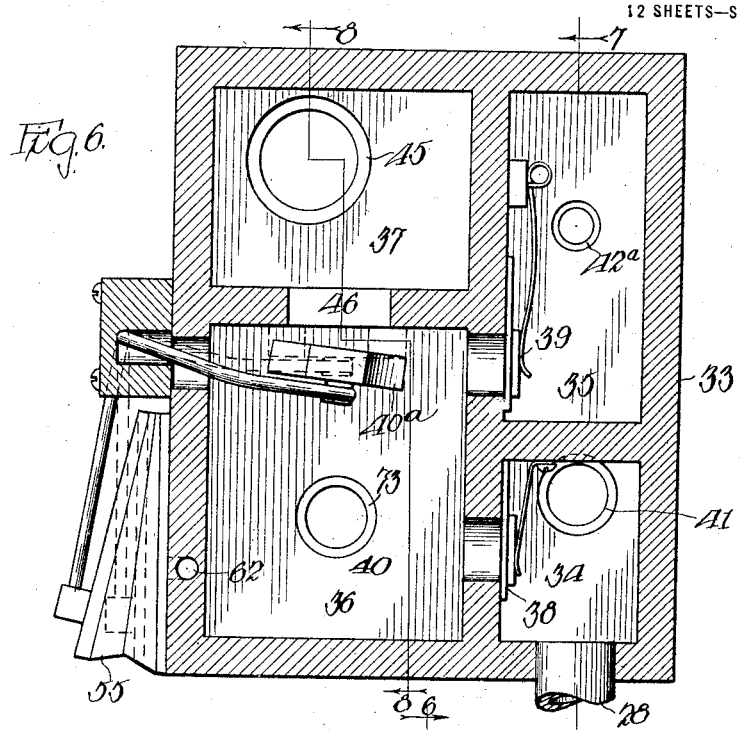
Fig. 6, is a section on line 6—6 of Fig. 7, looking in the direction of the arrows.
Figure 7:
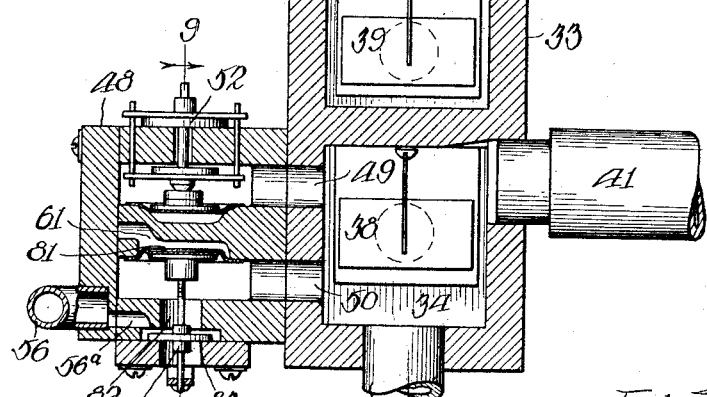
Fig. 7, is a section taken on line 7—7 of Fig. 6.
Figure 26:
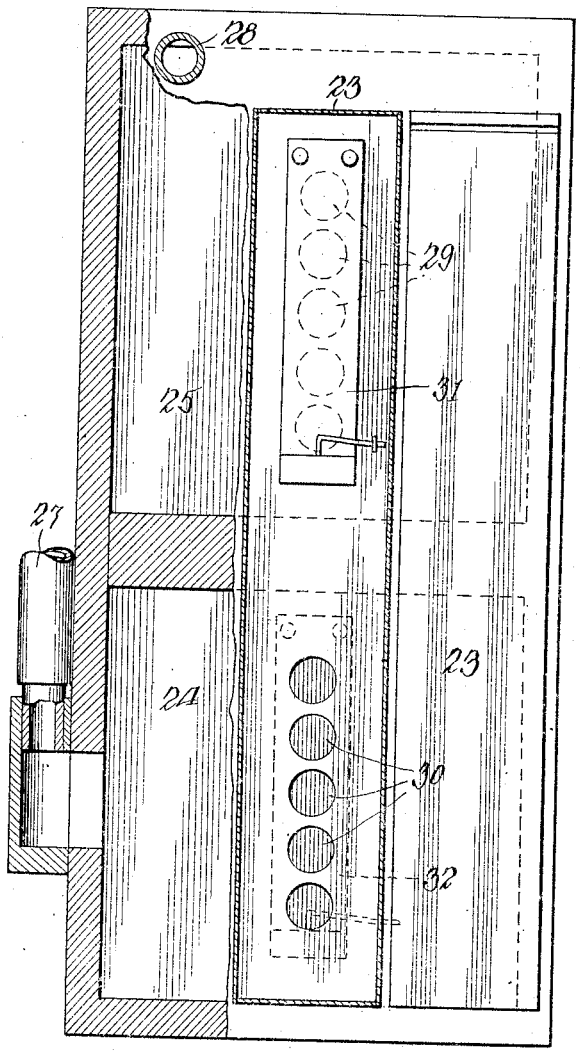
Figs. 26 and 27 are detail sectional views of the feeder bellows employed in the device.
Figure 27:
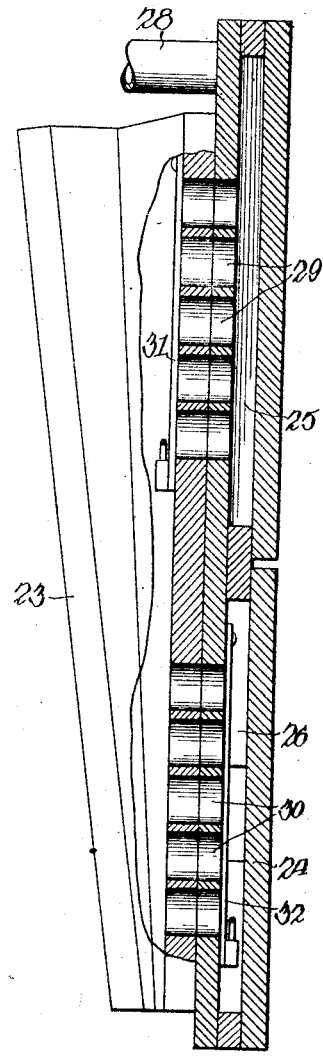

The construction of these bellows 13 is clearly shown in Figs. 26 and 27, from an inspection of which, it will be readily seen that the same are arranged so that a constant reduced air condition will result within the tubular portions and other mechanisms connected therewith. The construction of these pneumatics includes a plurality of separate swinging portions 23—23 which are secured to the chambered member 24, which is composed of the two chambered sections 25 and 26, which are provided with the tubular exhaust pipes 27 and 28. The chambers 25 and 26 are provided with the ports 29 and 30, respectively, which lead to the interior of the bellows 23 and are controlled by suitable valves 31 and 32. The arrangement of these valves is such that upon the operation of the swinging portions of the bellows, air will be exhausted from the chamber 25 into the chamber 26 to atmosphere. The tube 28 of the chambers 25 leads therefrom to the underside of the wind chest 33 which is composed of a plurality of separated chambers 34, 35, 36 and 37, which are controlled by the respective valves 38, 39 and $40^a$. The chamber 34 is connected by suitable means such as the tube 41, with the expression box 42. The chamber 35, is provided with a tubular connection such as $42^a$ which leads to the manually operated wind inducing apparatus 43, which includes foot pedals 44. When playing by the use of the foot pedals 44 expression may be given by any suitable lever and valve mechanism which is controlled by the hand, and which is ordinarily provided for this purpose. The chamber 37 is connected by means of the tube 45 with the player action 58. By referring to Fig. 6, it will be seen that the valves 38 and 39 control passages which lead into the chamber 40, and are arranged to operate only when a reduced air pressure exists in the respective chambers which they control. In other words, the valve 38 will not be actuated when the device is manually operated or the valve 39 permitted to leave its seat when the device is mechanically operated. It will also be seen that upon the operation of either the mechanical or manual operating means a reduced air pressure will exist in the chamber 36 which is connected with the chamber 37 by means of the valve controlled port 46, this chamber being connected with the player action through the medium of the tubular connection 45. The valve $40^a$ is provided for the purpose of cutting off the connection of the chamber 37 from the chamber 36, when the rewinding operation is taking place. The chamber 36 is further provided with a port 73, which leads into a governor box, (not shown) which governs the motor 71. A valve chest 48 is mounted upon one side of the member 33 and has ports 49 and 50 which lead to the chamber 34 and a port 51 which leads to the chamber 36 of the member 33. Valves 52, 53, and 54 are arranged within this chest, and operate to control the automatic rewinding of the music sheet, to restore the valves to playing position after the rewinding operation has taken place, to operate the pneumatic 55 to close the port 46 and shut off the reduced air pressure from the player action during the rewinding operation, and to control the passage 56 which leads to the controlling devices generally designated 57. The tubes 59 and 60 which lead to the valves 52 and 54 respectively may connect with apertures in the tracker bar, and be controlled by perforations properly positioned in the music sheet to cause the rewinding of the sheet when the piece has been played and to reset the valves so that they will be in their proper position, to be actuated by a music roll subsequently inserted in the machine. The valve 54 and the tube 59 and its connections coöperate to cause the rewinding mechanism to be operated. The operation of the coöperating parts whereby this is accomplished is substantially as follows:—

Upon registration of the apertures in the music sheet with the aperture in the tracker bar, the tubular connection 59 will admit air therein which causes the valve 54 to be lifted from its seat connecting the passage 61 and the passage 62 with the chamber 36 through the medium of the port 51. This causes the pneumatic 55 to be collapsed and the valve 40ª to close the port 46, thus cutting off any communication with the chamber 36 and the playing pneumatics of the player 58. It will be understood that the pneumatic 63 communicates in a suitable manner with the player action and when said action is in connection with the source of reduced air pressure said pneumatic will be collapsed, which through the medium of the rod 64 and the lever 65 will cause the pinion 66 to mesh with the gear wheel 67 and drive same. This causes the music sheet to travel across the tracker bar in the usual manner. It will be further understood that when the valve 40ª closes the port 46, that the connection with the source of reduced air pressure will be severed, this permits the pneumatic 63 to again expand, which causes the clutch member 68 to clutch the gear wheel 69 mounted on the shaft 70 which is driven by the motor 71. This causes a motion reverse to that imparted to the gear wheel 67 to be imparted to the spindle 72 which rewinds the music sheet. When the music sheet has traveled its required distance, a port 60ª connected with the tube 60 will be opened to atmosphere, this will actuate the valve 52 and admit atmosphere to the passage 74 which causes the valve 54 to be seated. A bleed port 75 is interposed between the tubular member 60 and the chamber 76, which is connected by the port 49 with the chamber 36. The passage leading to the tube 59 is also provided with a bleed port 78 which is in communication with the chamber 79 which is also connected with the chamber 36 by virtue of the part 51. Another bleed port 80 is provided between the passages 61 and 74. It will be noted that the passage 61 extends beyond and surrounds the flexible diaphragm 81 of the valve 53 and when a reduced pressure condition exists in the passage 61, the valve will be lifted and the port 82 closed, the reduced air pressure condition which existed between the chamber 36 and the valve controlling apparatus 57 disconnected, and an atmospheric connection made with the device 57 by virtue of the lifting of the valve 53 from the valve seat 83 which permits atmosphere to enter by way of the passage 56ª. Thus the sound controlling apparatus will be disconnected and rendered inoperative while the rewinding of the music sheet is taking place. This controlling device 57 is interposed between and connected with the expression box 42 and the chamber member 33, and is provided with connections such as 87 and 88 which lead to the tracker bar 87ª, over which the music sheet 88ª travels. The music sheet is provided with suitable apertures 89, 90, and 91 the apertures 89 and 90 being connected with the device 57 through the medium of the tubes 87 and 88. The tube 92 also coöperates with an aperture in the tracker bar but is connected directly with the expression box 42. The tubes 87, 88 and 92 are also provided with valves such as 93, 94, and 95, which form a convenient means whereby the expression devices may be manually controlled when desired. As before stated the tube 56 connects the device 57 with a source of reduced pressure existing in the chambered member 33. One end of this tube 56 connects with the chamber 96 of the member 57 as clearly shown in Fig. 16, of the drawings, and, when air is admitted in one of the tubes 87 or 88 its corresponding pneumatics will be actuated to operate one or all of the sliding valves 99, 100 and 101. The actuations of the pneumatics will be clearly understood by referring to Figs. 15 and 16, and is substantially as follows: Air being admitted to one or the other of the tubes 87 or 88 will act upon its corresponding valve-pouch 102 or 103. This will cause the valve 104 or 105 to be lifted from its seat and will connect one or the other of the pneumatics 97 or 98 and the chamber 96 by virtue of a passage such as 106 and 107. This will cause either one of said pneumatics to collapse and operate one or all of the sliding valve members 99, 100 and 101. These valve members are mounted and slide upon the port block 108, and are held thereon by any suitable means such as the leaf springs 109 which are attached to the bridge piece 110. The sliding valve members are held against lateral movement by means of the pins 111, provided at each end of each of said valves. The port block is provided with a passage 112 which is suitably connected with the reduced air pressure chamber 96 through the medium of the tubular connection 113, this port or passage 112 and the valves 99, 100 and 101 coöperate to actuate the several pneumatics *a*, *b*, *c* and *d*, shown in Figs. 13 and 15. A reduced air condition normally exists in these pneumatics which causes same to collapse, the object of this will presently be apparent. The pneumatics *a*, *b*, *c* and *d*, have provided at their ends, remote from the hinges thereof the swinging arms 114, which are designed to be interposed between the ends of the several sliding valves and the pneumatics 97 and 98 and actuate said valves when said pneumatics are operated.

It will be noticed by referring to Figs. 13 and 14 that these pneumatics 97 and 98 are each provided with a downwardly projecting portion 115 which extends entirely across the ends of the sliding valves, and also that each of the pneumatics 97 and 98 is provided with an inwardly projecting portion 116 which is substantially equal to the width of only one of said valves. The portions 116 are arranged upon the respective pneumatics 97 and 98 diagonally across from each other, so that they engage one end of the endmost sliding valves 99 and 101. These pneumatics move said valves one after the other to open and close ports which both increase and decrease the sound volume of the player.

It will be remembered that normally the pneumatics *a*, *b*, *c*, and *d*, are all contracted or collapsed. This naturally causes the uppermost portions of the arms 114 to be positioned above the sliding valves; consequently the same cannot be interposed between said valves and the swinging portion of the pneumatics 97 and 98 until air is admitted to the pneumatics *a*, *b*, *c*, and *d*. I therefore provide the pneumatics 97 and 98 with the inwardly projecting portions 116, and arrange them so that upon the first impulse of one of the above named pneumatics either one or the other of the valves 99 or 101 will be actuated depending upon whether the volume of the tone is desired to be increased or decreased. This positions the said valves to admit outside air to the desired one of the pneumatics *a*, *b*, *c*, and *d*, which permits it to expand and interpose the uppermost portion of one of the arms 114 between one of the pneumatics 97 and 98 and one of the valves 99, 100 or 101. As before stated the valves 99, 100 and 101 are normally connected to a source of reduced air pressure, which includes the passage 112. From an inspection of Fig. 19, it will be seen that this passage 112 is of a length sufficient to serve the several pneumatics *a*, *b*, *c*, and *d*, when the proper valve connections are made. By referring to Fig. 21 it will be seen that this passage 112 is provided in the lowermost section 120 of the valve block which is provided with the upwardly opening ports 121, 122 and 123 and also with the ports 124, 125, 126, and 127, which pierce this block and connect with the pneumatics *a*, *b*, *c*, and *d*, provided below said apertures. These last named apertures connect with the elongated recesses 128 and 129 which extend transversely to the passage 112. This block is also provided with the several elongated recesses 131, 132, 133, and 134, the last named of which terminates in a connection with the passage 128. The uppermost portion 135 of this valve block is provided with a series of apertures 136, 137, 138, and 139. The port 139 connects with the elongated passage 129, the ports 137 and 138 with the passage 133, and the port 136 with the port 134. A second series of ports 140, 141, 142, 143, 144, and 145 are also provided in the portion 135. The ports 142 and 144 connect with the passages 128 and 129 and the remaining ones connect directly with the source of reduced air pressure 112. The portion 135 is further provided with another set of apertures or ports, of which the aperture 146 connects with the passage 129, the apertures 147 and 148 connect with the recess 131, the port 149 with the passage 128, and the ports 150 and 151 with the recess 132. The apertures 152, 153 and 154 extend entirely through all of the portions forming the valve block and receive the tubes 155 to which are connected the flexible tubes 156, 157, and 158 which terminate in connections with the several valves 159, 160, 161 of the expression box 42. The several ports 136 to 154 inclusive, with the exception of the port 145 are governed by the sliding valves 99, 100, and 101, which when the proper connection is made actuates one or the other of the valves 159 to 161 inclusive of the expression box 42, which controls the reduced air pressure in the chambered member 33 and the playing pneumatics 58. Each of these sliding valves 99, 100, and 101 is provided with one or more recessed portions which serve to connect the several ports in the valve block. These are clearly shown in Figs. 23, 24, and 25. The valve 99 is provided with the L shaped recess 163 the port 164 and the recess 165. When this valve is in the positions shown in Fig. 19 the L shaped port will connect the ports 136 and 140 which causes a connection with the passage 112 and the passage 128 which causes the pneumatics connected thereto to be collapsed. The sliding valve 100 is provided with the L shaped recess 166 the elongated recess 167 the port 168 and the recess 169. When the valve 100 is in the position shown in Fig. 19 the recess 166 connects the port 141 with the port 137 which through the medium of the recess 133 Fig. 18 and the recess 170 of the valve 101, completes the connection between the passages 112 and 129, and also causes the pneumatics which are connected to this last named passage to be collapsed, the recess 167 at this time connects the port 150 and the port 149 with the elongated recess 132 which connects with the port 151 and which is closed by this valve 99. When the valve is in this last named position the port 168 therein is not connected with anything but is closed by the wall of the valve block. The valve 101 is provided with the elongated recessed passages 170 and 171 and the cut away portions 172. The portion 170 connects the ports 138, and 139 which are connected with the passages 133 and 129. When the valve is in this position the recessed portion 171 will connect the ports 146 and 147 which are connected with the passage 131.

When these valves are moved from one position to the other the sound of the player will be varied accordingly, that is, several variations of loud and soft music, result. For instance, when the valves are positioned as illustrated in Fig. 19, the player will be set for soft music, whereas if said valves are moved to their fullest extent in the opposite direction, the sound will be increased. These valves may be manipulated so that intermediate variations of sound between loud and soft may also result. The effect of the operation of the valves upon the pneumatics $a$, $b$, $c$, and $d$, will be generally as follows: Upon the opening of the aperture leading to the pneumatic 97 the valve 99 will be engaged and moved by the extension 116, and the pneumatics $a$ and $b$, will be expanded, thus interposing the arm 114 of each of those pneumatics between the ends of the valves 99 and 100 and the pneumatics 97 and 98. Upon the operation of the valve 100, said pneumatics $a$ and $b$, are again collapsed, and the pneumatics $c$ and $d$ expanded thus interposing the arms 114 of these pneumatics between the valves 100 and 101 and the pneumatics 97 and 98, and upon the operation of the third valve 101 all of said pneumatics $a$, $b$, $c$, and $d$, will again be collapsed and the arms 114 positioned above said valves 99, 100, or 101; consequently none of said valves will be actuated until one or the other of the pneumatics 97 or 98 is again operated. When said valves are moved in either direction instrumentalities are actuated which increase or decrease the sound which may emanate from the player. The actuation of the several valves will permit variations of this increased or reduced volume of sound. When the valve 99 is moved in the opposite direction to that shown in Fig. 19, the pneumatics $a$ and $b$ will be permitted to expand, which interposes the arms 114 of said pneumatics between the valves 100 and 101. When the valve 100 is moved in a direction opposite to that shown in Fig. 19, said pneumatics will again be collapsed, and upon the operation of the third valve 101 all of said pneumatics $a$, $b$, $c$, and $d$, will be collapsed and all of said arms 114 positioned above the valves so that they cannot be engaged by the pneumatics 97 and 98. It will be understood that the actuation of the pneumatics 97 and 98 depends upon apertures properly positioned in the music sheet, or may when desired be manually controlled by means of the valves 93 and 94 connected with the tubes or passages 87 and 88. As before stated the valves 99, 100, and 101, control connections such as the tubes 156, 157, and 158, which terminate in a connection with the valves 159, 160 and 161. These valves are mounted in a windway 175 which is connected by means of the tube 41 with the chamber 34 of the member 33 and with the windway 183 by the connections 183$^a$. To this windway 175 is connected a passage 176 having the branches 177 and 178, the branch 177 terminating in a connection with the atmosphere. One of the valves as 159 is interposed between the passages 177 and 178 and is operable to connect the passage 178 with the atmosphere or the windway 175. This passage 178 is connected with a pneumatic 179 by the tube 180 which when the valve 159 is operated causes the pneumatic 179 to be collapsed, unseating the valve 181, forming a reduced air connection through the port 182 (Figs. 10 and 12) between the windway 183, windway 184, port 185, chamber 186, and the controlling pneumatic 187. It will be understood that each of these valves 159 to 161 is connected in a manner similar to that just described and that each controls individual chambers such as 189 and 190 having individual pneumatics such as 187, the pneumatics only differing in that the springs or tension members of each are of relatively different strengths so that each requires relative greater amount of reduced air pressure to operate them.

The construction of all of these controlling pneumatics 187 being the same as the one shown in section in Fig. 11 an explanation of one will suffice, and be explained in detail. These pneumatics only operate when the reduced air pressure overcomes its tension member 191. When said tension has been overcome, the valve 192 will be lifted from its seat by the pin 194 which permits the introduction of outside air, thereby reducing the pressure in the chambers whose valve such as 181, has been operated causing a modified reduced air condition in the windway 183 and consequently the player action 58. It can be readily seen that when the valve which controls either of the chambers 186, 189 or 190 is operated, its corresponding pneumatic, such as 187, will be subject to operation, and if each of these pneumatics is supplied with a tension member in which is a relatively different strength, each will require a diffrent degree of reduced air pressure before it will be overcome; consequently a different reduced air condition will exist in the chamber member 33 before the valve, such as 192, will be operated to permit the introduction of outside air, which it can readily be seen will change the atmospheric condition which existed prior to the operation of said valve 192. The connection 41, between the expression box 42 and the chambered member 33 forms the means whereby the reduced air pressures are permitted to pass from one to the other. The tension of the springs 191 may be varied to a greater or less degree as found necessary. This is accomplished by means of the threaded bar 201, which has one of its ends attached to said spring and has its opposite end threaded and provided with the set-screw 202. As before stated, provision is made whereby a certain portion of the music sheet may be accentuated. This will be clearly understood by referring to Fig. 11, and includes the tube or passage 92, which when air is introduced therein operates the valve 196, connects the tube and passage 197 with the reduced air chamber 175, causes the pneumatic 198 to actuate the valve 199 which closes the port 182, preventing the reduced air contained in the chamber 183 from passing into the chamber 186, thus causing the entire reduced air pressure to act upon the player pneumatics, thereby causing a greater force to be applied to the piano action pneumatics, consequently, louder music. This feature may be accomplished and controlled by a suitable perforation in the music sheet and an aperture in the tracker bar to which the tube 92 is connected; this may also be controlled manually by means of the valve 95.

While I have herein described in some detail and illustrated a particular embodiment of my invention that I have found in practice to be advantageous and desirable in many of its details or features, and certain details of which I may claim, it will be understood that, in the broader aspects of my invention many changes may be made in the specific construction without departure from the spirit of my invention, and within the scope of the appended claims.

Having thus fully described my invention, what I claim as new and desire to secure by Letters Patent is—

1. In a device of the class described, the combination of a device having a plurality of valves, means for moving said valves, said valves being operably connected with means having members which may be interposed between the first mentioned means and said valves.

2. A device of the class described comprising in combination, a sound controlling device having separate expression controlling elements, valves controlling said expression controlling elements, said valves having passages which are adapted to be connected with each other to operate one or more of the expression controlling elements.

3. In a device of the class described, in combination a suction producing apparatus, a player action means whereby the action of the suction producing apparatus upon the player action may be varied, said means including a plurality of sliding valves and swinging pneumatics for operating said valves.

4. In a device of the class described, the combination of a device having a plurality of pneumatically operated valves, pneumatics with which said valves are operably connected, said pneumatics having members which may be interposed between the first mentioned pneumatics and said valves.

5. In a device of the class specified, the combination of a device having a plurality of pneumatically operated valves, said valves being operably connected with pneumatics having movable members which may be interposed between the first mentioned pneumatics and said valves, said movable members being arranged to be engaged upon the movement of the first mentioned pneumatics and to actuate said valves.

6. A device of the class described comprising in combination, a sound controlling device having separate expression controlling elements, a valve for each of said elements, said valves being controlled by valves including passages which are adapted to be connected with each other to operate one or more of the valves of the expression controlling elements.

7. In a device of the class specified, the combination of a device having a plurality of movable valves a swinging pneumatic constructed to operate said valves, means whereby said pneumatic may move the endmost valve without moving the other of said valves.

8. In a device of the class specified, in combination a device having a plurality of movable valves a pneumatic arranged to engage and move all of said valves and means whereby the endmost valve may be moved without moving the other of said valves.

9. In a device of the class described in combination a device having a plurality of movable valves a pneumatic arranged to engage and move said valves, and pneumatics controlled by the operation of said valves.

10. In a device of the class specified, the combination of a device having a plurality of movable valves, of pneumatics arranged to move the endmost of said valves in opposite directions, of pneumatics having members which may be interposed between the ends of said valves and said pneumatics whereby said valves may be moved in a reverse direction.

11. In a device of the class described, the combination of a device having a plurality of movable valves, of pneumatics arranged to move the endmost of said valves in opposite directions and means for moving the intermediate valves.

12. In a device of the class described, the combination of a device having a plurality of movable valves, of pneumatics arranged to move the endmost of said valves in opposite directions and means for moving the intermediate valves in opposite directions.

13. In a device of the class described, the combination of a device having a plurality of movable valve members, of pneumatics arranged to move the endmost of said valves in opposite directions and means for moving the intermediate valves, said means including said pneumatics.

14. In a device of the class described, the combination of a device having a plurality of movable valve members, of means for moving the endmost of said valves in opposite directions, and means for moving the intermediate valve members in opposite directions said means including the means whereby the endmost valves are moved.

15. A device of the class described comprising in combination, an expression controlling device, and valves controlling said expression controlling device, said valves including passages which communicate with each other, and which are adapted to be connected with other passages to operate the expression controlling device.

16. In a device of the class described, in combination, an expression box having a windway, a plurality of valves mounted in said windway, a pneumatic, each of said valves being operably connected with said pneumatic, a valve controlled by each of said pneumatics, pneumatics controlled by the last mentioned valves, each of said last mentioned pneumatics having a tension member and each of the tension members being of a different tension.

17. A device of the class described comprising in combination, an expression controlling device having separate sound controlling elements said elements having valves to permit the introduction of atmosphere and a valve for controlling the expression controlling elements, said last mentioned valves being under the control of the valves having passages which communicate with each other and which are adapted to be connected with other passages to operate the valves which control the expression controlling elements.

18. A device of the class described comprising in combination, an expression controlling device having a valve to permit the introduction of atmosphere and a valve which controls the expression controlling device, said last mentioned valve being under the control of valves having passages which communicate with each other and which are adapted to be connected with another passage to operate the valve which controls the expression controlling element.

19. A device of the class specified, in combination with a suction producing apparatus, a player action, means whereby the action of the suction producing apparatus upon the player action may be varied and means whereby intermediate degrees of the aforesaid variations are produced said means including a plurality of slide valves, and swinging pneumatics arranged to coöperate with said slide valves.

20. A device of the class described comprising in combination, an expression controlling device, means for actuating said expression controlling device, said means including a plurality of valves each of which has a passage adapted to be connected with another passage, said last mentioned passage being connected with the expression controlling device.

21. In a device of the class specified, in combination with a suction producing apparatus, a player action, means whereby the action of the suction producing apparatus may be varied, means whereby intermediate degrees of the aforesaid variations are produced, said means including a plurality of consecutively operated valves, pneumatics for operating said valves, and means arranged to be interposed between said valves and the pneumatics by which they are operated.

22. In a device of the class described, in combination with a suction producing apparatus, a player action, means whereby the action of the suction producing apparatus may be varied, means whereby intermediate degrees of the aforesaid variation are produced, said means including a plurality of consecutively operated valves, swinging pneumatics for operating said valves, and means arranged to be interposed between said valves and said swinging pneumatics.

23. In a device of the class specified in combination with a suction producing apparatus a player action, means whereby the action of the suction producing apparatus may be varied, means whereby intermediate degrees of the aforesaid variation are produced said means including a plurality of valves, means for operating said valves, and means arranged to be interposed between said valve and said operating means, one of said valves forming a means whereby the operations of said last mentioned means are controlled.

24. In a device of the class described, in combination with a suction producing apparatus a player action, means whereby the action of the suction producing apparatus may be varied, means whereby intermediate degrees of the aforesaid variations are produced said means including a plurality of consecutively operated slide valves and swinging pneumatics for operating said valves, and means arranged to be interposed between said slide valves and said swinging pneumatics, one of said slide valves forming a means whereby the operation of the last mentioned means is controlled.

PEDER WIGGEN.

Witnesses:
CHAS. C. TILLMAN,
L. C. PUZICK.

Copies of this patent may be obtained for five cents each, by addressing the "Commissioner of Patents, Washington, D. C."